United States Patent
Coleman

[19]

[11] Patent Number: 5,877,888
[45] Date of Patent: Mar. 2, 1999

[54] SINGLE AND DOUBLE SIDED ELECTROCHROMIC DISPLAYS

[75] Inventor: James P. Coleman, St. Louis, Mo.

[73] Assignee: Monsanto Company, St. Louis, Mo.

[21] Appl. No.: 872,544

[22] Filed: Jun. 10, 1997

[51] Int. Cl.⁶ .................................. G02F 1/17; G09F 9/00
[52] U.S. Cl. .................. 359/267; 359/265; 359/266; 359/268; 359/269; 359/271
[58] Field of Search ................................ 359/265, 266, 359/267, 268, 269, 271

[56] References Cited

U.S. PATENT DOCUMENTS

| | | | |
|---|---|---|---|
| 3,978,007 | 8/1976 | Giglia et al. | 359/265 |
| 4,106,862 | 8/1978 | Bayard | 359/265 |
| 4,256,380 | 3/1981 | Barclay et al. | 359/265 |
| 4,280,754 | 7/1981 | Yano et al. | 359/265 |
| 4,354,741 | 10/1982 | Mano et al. | 359/265 |
| 4,465,341 | 8/1984 | Nanya et al. | 359/268 |
| 4,550,982 | 11/1985 | Hirai | 359/265 |
| 4,596,722 | 6/1986 | Warszawski | 359/265 |
| 4,702,566 | 10/1987 | Tukude | 359/265 |
| 4,746,200 | 5/1988 | Kamigaki | 359/265 |
| 4,750,817 | 6/1988 | Sammells | 359/265 |
| 4,810,067 | 3/1989 | Demiryont | 359/265 |
| 4,824,221 | 4/1989 | Endo et al. | 359/265 |
| 5,078,480 | 1/1992 | Warszawski | 359/265 |
| 5,080,470 | 1/1992 | Warszawski | 359/265 |
| 5,082,355 | 1/1992 | Warszawski | 359/265 |
| 5,189,549 | 2/1993 | Leventis et al. | 359/271 |
| 5,216,536 | 6/1993 | Agrawal et al. | 359/274 |
| 5,413,739 | 5/1995 | Coleman | 359/265 |
| 5,442,478 | 8/1995 | Lampert et al. | 359/273 |
| 5,446,577 | 8/1995 | Bennett et al. | 359/273 |
| 5,500,759 | 3/1996 | Coleman | 359/270 |

FOREIGN PATENT DOCUMENTS

| | | |
|---|---|---|
| 966923 | 4/1975 | Canada . |
| 54-34257 | 3/1979 | Japan ................................ 359/267 |
| 56-40811 | 4/1981 | Japan ................................ 359/265 |
| 59-35006 | 8/1984 | Japan ................................ 359/265 |
| 62-044719 | 2/1987 | Japan . |
| 62-049333 | 4/1987 | Japan . |
| WO 91/13381 | 9/1991 | WIPO . |
| WO 92/18896 | 10/1992 | WIPO . |
| WO 93/21557 | 10/1993 | WIPO . |
| WO 94/15246 | 7/1994 | WIPO . |

*Primary Examiner*—Georgia Epps
*Assistant Examiner*—Margaret Burke
*Attorney, Agent, or Firm*—Howell & Haferkamp, LC

[57] ABSTRACT

An electrochromic display device and method are disclosed. The device comprises an ionically isolative layer containing an electrochromic material in contact with an electrolyte layer and a working electrode. The working electrode is positioned on a first side of a substrate, while a counter electrode is positioned on an opposite side of the substrate. The counter electrode is electrically coupled to the electrolyte layer on the substrate first side through one or more openings extending through the substrate. In another embodiment, ionically isolative and electrolyte layers are also provided in contact with the counter electrode on the backside of the substrate to create a double sided display. The method comprises reversible electrochromic effects of the electrochromic materials contained in either the ionically isolative layers or the electrolyte layers.

20 Claims, 2 Drawing Sheets

SINGLE AND DOUBLE SIDED ELECTROCHROMIC DISPLAYS

BACKGROUND OF THE INVENTION

(1) Field of the Invention

This invention relates generally to the field of electrochromic display devices and, more particularly, to electro-optical devices and methods utilizing working and counter electrodes on opposite sides of a substrate for single and double sided electrochromic displays.

(2) Description of the Related Art

An electrochromic display utilizes an electrolyte layer in contact with an electrochromic material. By applying an electrical potential across an interface between the electrolyte and the electrochromic material (or, in the case of a soluble electrochromic material, between the electrode and the electrolyte containing the dissolved electrochromic material), an electrochromic effect can be generated which changes the color or optical density of the electrochromic material. Examples of these electrochromic displays can be found in International Patent Application No. PCT/US93/12431, International Publication No. WO 94/15246, filed Dec. 21, 1993, the disclosure of which is incorporated herein by reference.

Electrochromic materials can be dispersed in an electrically conductive, substantially ionically isolative layer which contacts an electrolyte layer. Electrodes can be provided for applying a voltage across an interface of the ionically isolative layer and the electrolyte layer in order to generate an electrochromic effect at the interface. In one type of electrochromic device, the electrolyte and ionically isolative layers are sandwiched between a vertically stacked pair of a working electrode and a counter electrode. Upon applying a voltage across the electrodes, an induced current flows in a single direction across the interface of these layers to generate an electrochromic effect having a single color. Thus, a single-sided electrochromic display is produced that can display an image in a single color. However, because the electrochromic color change takes place at the interface between the two electrodes, one electrode must be transparent. Transparent electrodes typically have a high resistance and, therefore, can significantly decrease the overall conductivity of the display device and increase the voltage required for switching. Another drawback of transparent electrodes is that they are expensive compared to conventional printed circuitry fabricated with conventional silver ink, at least insofar as the finished product is concerned.

Another example set forth in the above-referenced international application includes the use of side-by-side counter and working electrodes having a common ionically isolative layer and a common electrolyte layer laminated thereon. Because the electrochromic effect generated at the interface of these layers is positioned above the counter and working electrodes, neither electrode need be transparent. However, when a voltage is applied to the working electrode, an induced current will flow from the working electrode and across its interface region in a first direction, through the electrolyte layer, and then across the interface region above the counter electrode in an opposite direction. As a result of the current crossing the two interfacial regions in opposite directions, the electrochromic effect generated above each electrode will have a different color from the other due to opposite changes in the oxidation state of the electrochromic material.

Thus, for a given electrochromic material, this display may be incapable of displaying an image with only a single color unless extensive masking is provided. If the electrochromic material must be chosen such that an electrochromic effect is only generated upon the gain or loss of an electron, such a selection must be made from a more limited group of suitable materials. Moreover, to utilize this electrochromic display to generate a particular image, the working and counter electrodes must be arranged in particular image-defining patterns. Because both of these electrodes are positioned on the same side of a substrate material, the physical layout for these electrodes can become unduly complicated, particularly where a relatively elaborate image, such as one containing alphanumeric characters, is to be displayed. Additionally, because side-by-side electrodes are used on the same side of the substrate, twice as much substrate area is needed than if only one electrode were utilized on each side.

U.S. Pat. No. 5,446,577 to Bennett et al. is directed to display devices having a transparent outer layer, a first electrode having a reflective surface facing the transparent layer, an electrochromic material located between the reflective surface and the outer transparent layer, an electrolyte in contact with the electrochromic material and a second electrode located behind the first electrode. The first electrode is ion-permeable, allowing ions to pass through and contact the electrochromic material in order to alter the optical properties of the material. This reference states that a two-sided display structure is possible, but indicates that such a device would include a third electrode functioning as a counter electrode in the interior of the device, and that the visible electrodes would both be working electrodes. There is no suggestion of a two-electrode, two-sided structure in which the working and the counter electrode both provide electrochromic color changes, nor is there any suggestion of effecting an electrochromic color change by the reversible, electrical deposition of a metal dissolved (as a metal salt) in an electrolyte.

It would, therefore, be desired to have a double-sided electrochromic display device which can be configured to display a particular image in a single color, where desired, without an excessively complicated layout pattern for the working and counter electrodes. Additionally, a double-sided electrochromic display device is also needed where separate images can be displayed on each side of the device, and which requires a minimum of masking and substrate area.

SUMMARY OF THE INVENTION

The inventor herein has succeeded in devising a novel electrochromic device and method for displaying images in a single color, where desired, as well as for displaying images on both sides of a display device, with a minimum of layout complexity. In accordance with the present invention, a working electrode is positioned on a first side of a substrate, with a counter electrode positioned on another side, such as the back, of the substrate. An optically opaque, electrically conductive, ionically isolative layer containing an electrochromic material is laminated with an electrolyte layer, and contacts the working electrode in one of several arrangements, as described in greater detail below. Openings are provided in the substrate through which the electrolyte layer extends to contact the counter electrode on the back side of the substrate.

In one embodiment of the invention, the working electrode is in contact with the top side of the substrate and the ionically isolative and electrolyte layers are positioned above the working electrode. Upon applying a voltage across the counter and working electrodes, with the positive side applied to the working electrode, an induced current flows from the working electrode and upward through the interface of the ionically isolative and electrolyte layers to create an electrochromic effect thereat. The induced current continues to flow through the electrolyte layer, including the portions that extend around the sides of the working electrode and through the openings in the substrate, to reach the counter electrode (which is also in contact with the electrolyte) on the back side of the substrate. Hence, the induced current only flows across the interface region in a single direction (upward) and, therefore, only generates a single color at the front surface. Because the working electrode is covered by the optically opaque ionically isolative layer, the working electrode is not visible and need not be transparent. To generate a desired image, the working electrode can be formed on the substrate in an image-defining pattern, as can the ionically isolative layer. However, because the counter electrode is provided on the back side of the substrate, and is electrically coupled to the working electrode through portions of the electrolyte layer extending through the openings provided in the substrate, the counter electrode need not be formed in any particular pattern, and can instead have a simple configuration. The counter electrode is configured so that a complementary chemical process to that which occurs at the working electrode occurs when current flows in the electrochromic device. Removing or reversing the polarity of the applied voltage reverses the color change.

In a variation of this first embodiment of the present invention, additional electrolyte and ionically isolative electrochromic layers are laminated on a bottom side of the counter electrode. In this variation, the counter electrode is electrically coupled to the working electrode through the ionically isolative and electrolyte layers on the backside of the substrate, in addition to those provided on the front side of the substrate, and by ionic communication between the electrolytes through the openings which extend between the front and back sides of the substrate. As a result, a positive voltage applied to the working electrode with respect to the counter electrode will induce a current which flows in a first direction across the interface on the top side of the substrate (from the ionically isolative layer to the electrolyte layer), and in an opposite direction across the interface on the bottom side of the substrate (from the electrolyte layer to the ionically isolative layer). Hence, where the electrochromic material in each of the ionically isolative layers is the same, in some cases, electrochromic effects having different colors will be generated on both sides of the substrate to create a double-sided electrochromic display device. In this variation, the working and counter electrodes and the ionically isolative layers can be formed in image-defining patterns to generate desired images on both sides of the display device. In some other cases in which an electrochromic material having only two colors is used, e.g., for the counter electrode, only one electrode may show a color change, because the electrochromic material on (in this case) the counter electrode may have to be oxidized more completely than is typically done on the counter electrode to change colors (from blue to white for Prussian blue, for example).

Among the several advantages found to be achieved by the present invention include an electrochromic device and method which can display an image in a single color with a minimum of layout complexity, substrate area, masking, and manufacturing cost. The device is not limited in its selection of electrochromic materials, but rather, can select from a wide variety of suitable materials. Additionally, these advantages can also be achieved in a double sided display for displaying desired images on either or both sides of the display, e.g., to be mounted in a store window. Such double sided displays may have complementary electrochromic materials for working and counter electrodes, one being an anodic electrochromic material, and the other being a cathodic electrochromic material, so that, even with only two states for each material, switching occurs on both sides. Another major advantage of the present invention is that large areas of an electrochromic display can be switched more readily when a counter electrode is on the backside of a substrate than when both the counter electrode and working electrode are both on the same side of the substrate.

While the principal advantages and features of the invention have been described above, a greater understanding of the invention may be attained by referring to the drawings and the description of the preferred embodiment which follow.

DETAILED DESCRIPTION OF THE PREFERRED EMBODIMENT

At the outset, it should be understood that the term "color change" as used herein (including in the claims) is intended to encompass changes in reflectance, as well. For example, each of the following changes would be considered a "color change" for the purposes of this patent: a change from blue to red; a change from light blue to dark red, a change from light blue to dark blue; and a change from dark gray to light gray.

Figure 1:
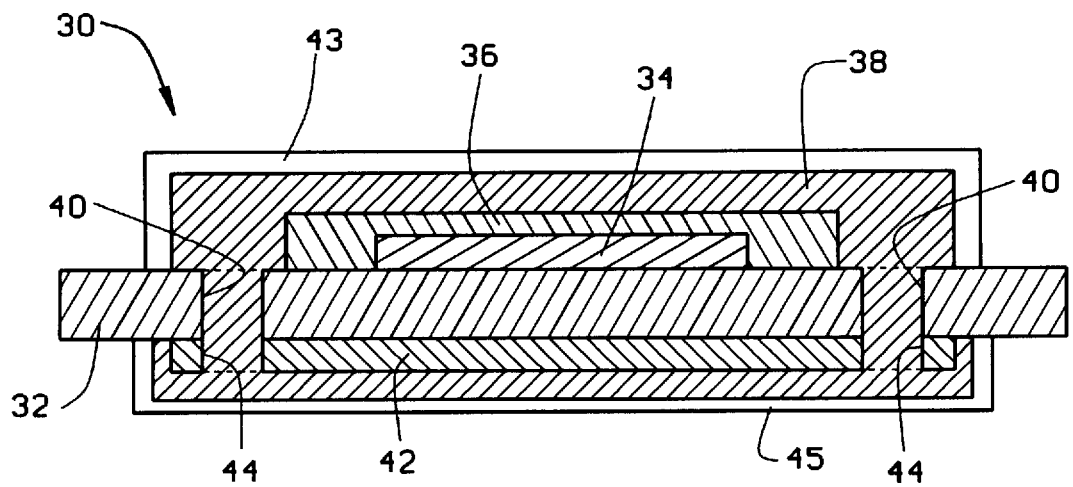
FIG. 1 illustrates a cross-sectional view of a first embodiment of a single sided electrochromic display device according to the present invention.

A single sided electrochromic display according to the present invention is illustrated in FIG. 1. As shown therein, display 30 includes a substrate 32 having a working electrode 34 positioned thereon. An electrically conductive, ionically isolative layer 36, which contains an electrochromic material that changes color when subjected to an electrochemical potential, is laminated over the top and sides of working electrode 34. An electrolyte layer 38 is laminated over ionically isolative layer 36 and extends through openings 40 which extend between top and bottom sides of substrate 32. A counter electrode 42 includes openings 44 that are coextensive with openings 40 in substrate 32 when counter electrode 42 is positioned on a bottom side of substrate 32. The electrolyte layer 38 contacts counter electrode 42. Preferably, electrolyte layer 38 extends through and completely fills openings 40 and 44 to contact and cover counter electrode 42. Alternatively, electrolyte layer 38 could extend around sides of substrate 32 to contact and cover the counter electrode. At least enough of counter electrode 42 is covered to balance, by a compensating electrochemical reaction, the electrochromic reaction that occurs in the electrically conductive, ionically isolative layer 36. The single sided display 30 of the preferred embodiment also includes a first non-conducting, preferably transparent layer 43 which is positioned over electrolyte layer 38 on the working electrode side of substrate 32, and a second non-conducting layer 45 positioned over electrolyte layer 38 on the counter electrode side of substrate 32 to maintain the gel-like character of the layer and inhibit evaporation. (The second, non-conducting layer 45 need not be transparent or translucent in a single-sided display.)

The conductors to the electrodes of the preferred embodiments can be formed of carbon; metals such as silver, copper, nickel, and aluminum; metal oxides such as tin oxide or indium-doped tin oxide (ITO), antimony-doped tin oxide (ATO), or fluorine-doped tin oxide (FTO); conductive inks comprising conductive particles such as silver flake or carbon dispersed in a polymer or resin solution; intrinsically conductive polymers such as polyaniline and polypyrrole; and polymers filled with conductive particles. The electrode surface is typically a conductor such as ATO. The electrochromic materials utilized in the present invention include, but are not limited to, metals which can be electrically plated or deposited from solution at an interface with the electrolyte layer, and other electrochromic materials such as viologens; intrinsically conductive polymers such as polyaniline and polypyrrole; and electrochromic metal oxides such as $WO_3$ or ATO. (The preparation and use of suitable forms of ATO and certain other metal oxides as electrochromic materials are described in my copending U.S. application Ser. No. 08/721,506, filed Sep. 26, 1996, which is herein incorporated by reference in its entirety.) The ionically isolative layer of the preferred embodiment may have the electrochromic materials dispersed therein, and comprises an optically transparent or translucent polymer matrix. The electrolyte layer is typically aqueous or organic solvent based. The substrate can be constructed from glass, mylar, or other suitable, substantially non-conductive materials.

To use the single sided display 30 shown in FIG. 1, a voltage is applied across working electrode 34 and counter electrode 42 to generate an electrochromic effect. Although the operation of the display will now be described for a positive voltage applied to the working electrode, it should be understood that, for many electrochromic materials, an electrochromic effect can be generated by applying a negative voltage to the working electrode. A current induced by the applied voltage will take the path of least resistance between working electrode 34 and counter electrode 42. Due to the relative thicknesses of ionically isolative layer 36 on the top and sides of working electrode 34, and because ionically isolative layer 36 is substantially less conductive than electrolyte layer 38, the induced current will flow from working electrode 34 and through the portion of ionically isolative layer 36 on the top side of the working electrode to reach conductive electrolyte layer 38. The induced current will then flow through the electrolyte layer, including the portions of the electrolyte layer extending through openings 40 and 44 in the substrate and counter electrode, to reach the counter electrode 42. As a result of the current flow across the interface of the electrolyte layer and the portion of the ionically isolative layer on the top side of the working electrode, an electrochromic effect is generated which causes the electrochromic material to change color.

A transfer of electrons to the electrochromic particles contained in the ionically isolative layer requires ion transfer to or from the electrochromic material. Because the layer in which the electrochromic material is contained is essentially ionically non-conductive, ion transfer from the electrolyte layer to the electrochromic material occurs only at the interface of the ionically isolative and electrolyte layers, and not substantially at the underlying electrode structure. The mobility of ions to or from the electrochromic material at the interface allows electron transfer to the mobile ion-receptive electrochromic material at the interface. A change in the oxidation state of the electrochromic material results in the color change at the interface.

Hence, a single sided electrochromic display which displays a single color can be created by "sandwiching" the electrodes and the ionically isolative and electrolyte layers where neither of the electrodes need be transparent. To display a desired image with the single sided display 30 shown in FIG. 1, an opaque mask can be used over the display to cover portions of the electrochromic effect at the interface of the electrolyte and ionically isolative layers, as well as to mask out other undesirably visible portions of display 30, so that unmasked portions of the electrochromic effect display a desired image. The opaque mask can have cut out portions which correspond to the pattern of the desired image such that only the portions of the electrochromic effect which lie in the pattern of the desired image can be seen through the opaque mask.

Figure 2:
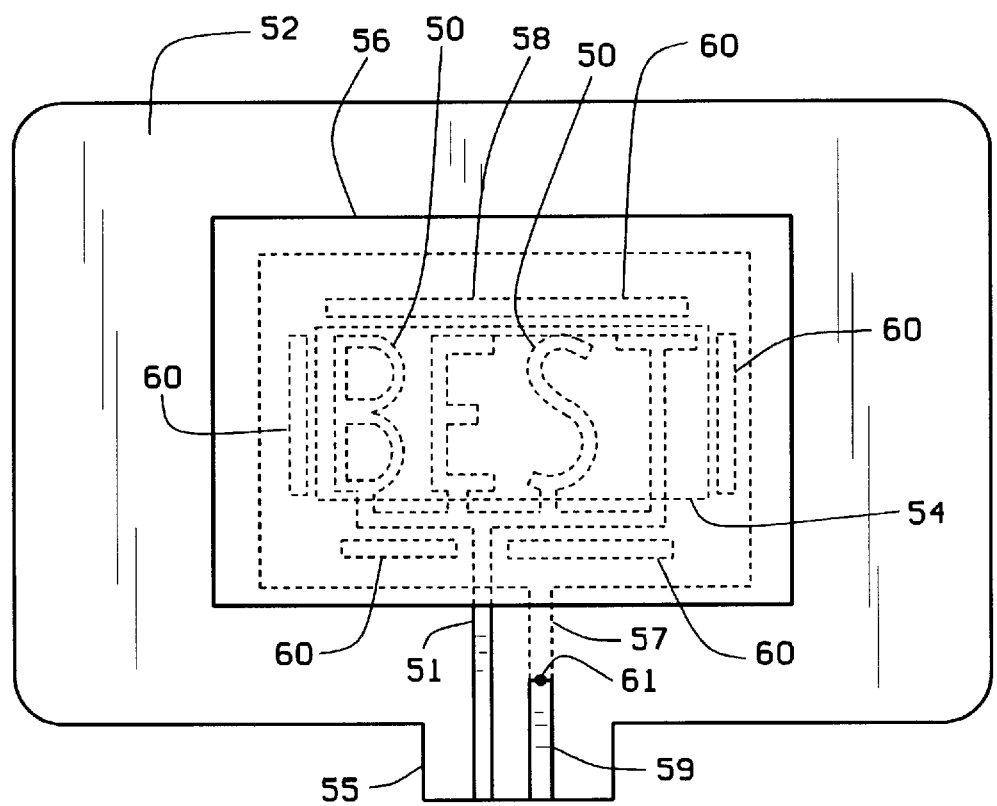
FIG. 2 illustrates a single-sided electrochromic display device having a working electrode formed in an image defining pattern.

However, several alternatives exist to using an opaque mask for displaying a desired image with the single sided display 30 of the preferred embodiment, such as that shown in FIG. 2. In FIG. 2, the uppermost layers on a front surface of the display embodiment as seen from the top of the display (except for a transparent or at least translucent non-conductive layer, not shown in FIG. 2, that may be used to cover, seal in, and protect electrolyte layer 56) are illustrated by solid lines, and layers or structures beneath the uppermost layers and on the reverse side of substrate 52 are illustrated by dashed lines (except for the electrolyte layer on the reverse side of substrate 52 and a non-conductive layer that may be used to cover, seal in and protect the electrolyte layer on the reverse side of substrate 52.) A working electrode 50 can be printed on a substrate 52 in an image defining pattern with an electrically conductive, ionically isolative layer 54 optionally containing an electrochromic material laminated over working electrode 50, which is formed into a desired display pattern. An electrolyte layer 56 is laminated on a top side of the ionically isolative layer 54, and is electrically coupled to a counter electrode 58 positioned on a backside of substrate 52 through several openings 60 extending between the front and back sides of substrate 52. (If there is no electrochromic material in electrically conductive, ionically isolative layer 54, then an electrochromic material, such as a metal salt or a viologen, for example, must be dissolved in the electrolyte.) Electrolyte layer 56 extends through and fills openings 60 to contact and (preferably completely) cover counter electrode 58 on the back side of substrate 52. Leads 51 and 57, connected to working electrode 50 and counter electrode 58, respectively, may be brought out to a tab 55 on substrate 52 to allow convenient connection to a source of electrical power. Although not required, a through-hole 61 filled or lined with conductive material is provided so that there is an electrical connection between lead 57 and lead 59 so that an electrical connection can be made to both the working electrode 50 and the counter electrode 58 from only one side of tab 55 for the sake of convenience.

Upon applying a voltage between the working and counter electrodes, with the positive side applied to the working electrode, an induced current will flow upwardly from the working electrode, through portions of ionically isolative layer 54 positioned directly above the working electrode 50, and to the electrolyte layer 56. The induced current will then flow through electrolyte layer 56, including the portions of the electrolyte layer extending through openings 60, to reach counter electrode 58 on the substrate backside. As a result of the induced current, those portions of ionically isolative layer 54 through which the induced current flows will have an electrochromic effect generated at the interface of those portions and the electrolyte layer.

In this manner, a single sided image display having a single color is provided without the need for an opaque mask having the desired image pattern cut out therefrom, and with only the working electrode formed in an image defining pattern. However, additional masking may still be necessary. For example, an opaque mask can be utilized to cover portions of working electrode 50 that are visible through the transparent or translucent electrolyte layer 56, as well as to mask visible portions of substrate 52, when desirable.

Figure 3:
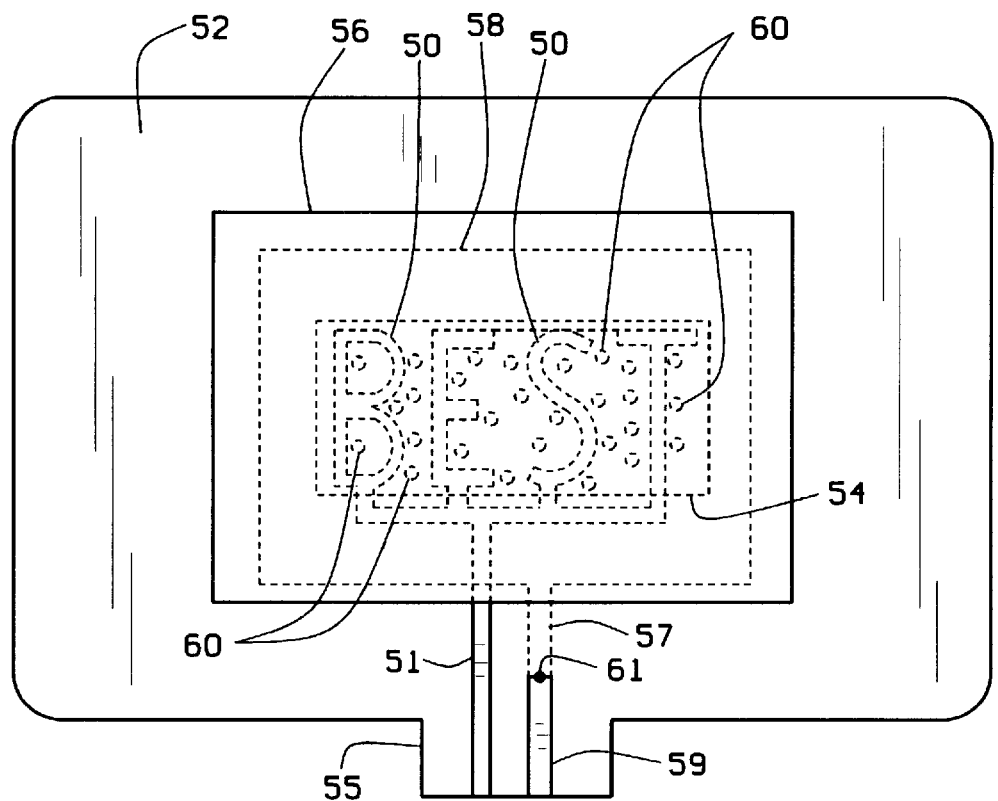
FIG. 3 illustrates a cross-sectional view of another embodiment of an electrochromic display device according to the present invention.

FIG. 3 (which uses the same convention for solid and dashed lines as FIG. 2, and which also does not show the electrolyte layer on the reverse side of the substrate and the non-conductive cover layers on either side of the substrate) illustrates another embodiment of the present invention for generating an image on a single sided display by having openings 60 in the ionically isolative layer 54 itself. Openings 60 may be formed by any suitable method, such as by drilling, cutting, or punching, but these methods are provided by way of example only and are not intended to be limiting. Counter electrode 58 is coated with an ionically isolative layer. Electrolyte layer 56 extends through, and preferably fills, holes 60 so as to contact counter electrode 58 on the back side of substrate 52.

Upon applying a voltage across working electrode 50 and counter electrode layer 68, an induced current will flow from working electrode 50, through ionically isolative layer 54, and to electrolyte layer 56. From the electrolyte layer 56, the induced current will flow through holes 60 to reach counter electrode 58. As a result of the current flow across the interface of the ionically isolative layer and the electrolyte layer, and due to the pattern of the ionically isolative layer, an electrochromic effect will be generated to display the desired image. An opaque mask might still be desired to cover portions of working electrode 50 that are not covered by ionically isolative layer 54 and, hence, are visible through the transparent or translucent electrolyte layer 56. Additionally, masking might be desired where the appearance or color of counter electrode layer 58, portions of which will be visible through holes 60, differs from the appearance or color of substrate 52.

FIGS. 2 and 3 are illustrative of single-sided embodiments of the inventive display in which the holes extending between the front and back side of the substrate are outside of the image region of the display. However, it is preferable that the holes be as close to the imaging area as possible for best results, and it is even desirable, as an alternative or in addition to the above-described through-hole configurations, to have holes extending through the imaging area itself, including the working (and counter) electrode, as shown in the side section view of FIG. 4.

Figure 4:
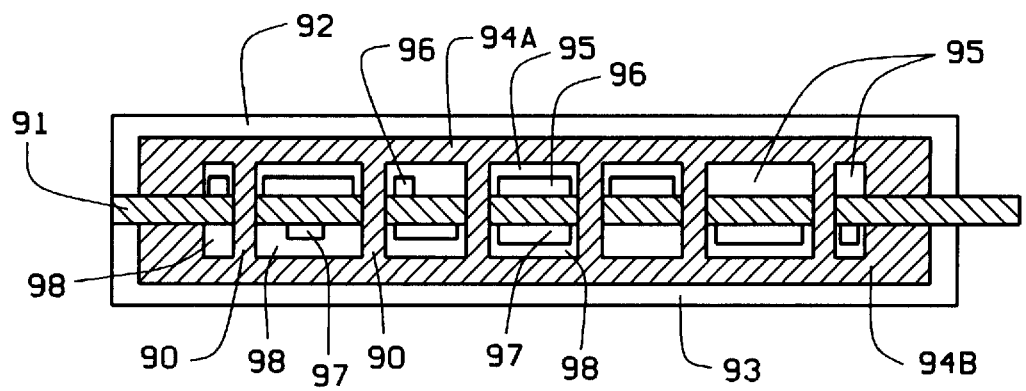
FIG. 4 is a cross sectional view of an embodiment of a double sided electrochromic display device in accordance with the present invention.

FIG. 4 shows holes 90 passing through a working electrode 96 positioned on the top side of a substrate 91, and a counter electrode 97 positioned on the bottom side of substrate 91. The holes 90 also pass through ionically isolative, electrically conductive layers 95 and 98, which cover working electrode 96 and counter electrode 97, respectively. (While it is desirable for the holes 90 to pass through both electrodes 96 and 97 and both ionically isolative, electrically conductive layers 95 and 98 so that the ionic communication path between the electrochromic image regions is minimized, some or all of holes 90 may pass through an electrode and ionically isolative, electrically conductive layer on only one side of the substrate, or only an ionically isolative, electrically conductive layer on only one or both sides of the substrate, or only an ionically isolative, electrically conductive layer on one side of the substrate and an electrode and another ionically isolative, electrically conductive layer on another side of the substrate, or only through the substrate. When there are multiple holes, any combination of these possibilities is also possible. Ionically isolative, electrically conductive layer 95 covering working electrode 96 contains an electrochromically active material. Working electrode 96 and counter electrode 97 may be applied in a pattern; thus, as shown, there may be portions of ionically isolative, electrically conductive layers 95 and 98 that directly contact substrate 91. Electrolyte layers 94A and 94B are provided to cover the ionically isolative, electrically conductive layers 95 and 97, respectively. Electrolyte layers 94A and 94B communicate through holes 90 and are thereby electrically and ionically coupled to one another. Depending upon the nature of electrolyte layers 94A and 94B, which could be a free-flowing liquid solution, transparent (or at least translucent) protective cover layers 92 and 93 may be supplied to prevent the electrolyte from leaking and/or to protect the display from its environment.

Upon applying a voltage across working electrode 96 and counter electrode 97, an induced current will flow through portions of inonically isolative layer 95 positioned on the top side of working electrode 96. As a result, an electrochromic effect is generated at the interface of ionically isolative layer 95 and electrolyte layer 94A, in the regions in which ionically isolative layer 95 covers working electrode 96.

In the embodiment of FIG. 4, the substrate 91 may typically be about 5 mils thick (although it should be recognized that all dimensions recited herein are exemplary only and not intended to be limiting). The holes 90 should be large enough to provide reasonable conductivity, but not so large as to destroy the design or weaken the substrate 91. The dimensions of the holes are not critical, nor is their number, if the conductivity is adequate. Holes as small as a few mils in diameter can be used, the number and actual diameter of which can be determined readily by trial and error. One to two millimeter diameter holes punched a centimeter apart in a square pattern for a typical display with a 5 mil substrate can be expected to work would provide a good starting point for further adjustment and optimization if desired. Furthermore, some ionically isolative, electrically conductive material (or even a small amount of electrode material) may create a weakly electrically conductive path from the working electrode 95 to the counter electrode 97, through holes 90, such as by adhering to the inside surface of the holes. As long as the short-circuit is of a relatively high resistance (e.g., greater than 1000 ohms for a display of 10 square inches, but exact values are not critical, and this value should be considered as a rough guideline only) and there remains adequate ionic communication between electrolyte layers 94A and 94B, the display will function properly. The high-resistance short circuit may even be advantageous in that it may reduce the time required to make an electrochromic image disappear, when that result is desired.

The structure of FIG. 4 allows the use of a large area of electrochromic material without requiring a transparent working electrode or counter electrode. By the use of holes throughout the large area of electrochromic material (rather than just at the periphery of the electrochromically active area, or between such areas), the large distance lateral ion flow is reduced. The ion flow is only required to go through relatively close through-holes which can be small and relatively inconspicuous relative to the electrochromic image.

While each of the above-described embodiments have been single-sided, in that they have been described as having an electrochromically-active substance in a layer over the working electrodes, one skilled in the art should recognize, after reading the descriptions, that two-sided displays are also possible. In such displays, the counter electrode becomes functionally equivalent to the working electrode. Referring, for example, to FIG. 4, counter electrode 97 is shown (in cross-section) as being patterned similarly to working electrode 96 (albeit not necessarily in the same pattern). If ionically isolative, electrically conducting layer 98 contains an electrochromically active material, current flowing through holes 90 into electrolyte layer 94B will flow through ionically isolative, electrically conducting layer 98 to electrode 97. This creates an electrochromic effect at the interface of ionically isolative layer 98 and electrolyte layer 94B in regions in which ionically isolative layer 98 overlays electrode 97. Of course, to observe this effect, if a protective layer 93 is used, it must be transparent, or at least translucent, over the region where the effect takes place. Similar double-sided displays could be constructed from the embodiments of FIGS. 2 and 3, because the use of both sides of the display need not be limited to particular through-hole placements.

Returning to the example illustrated in FIG. 4, where the electrochromic materials contained in ionically isolative, electrically conductive layers 95 and 98 are the same, the color of the electrochromic effects created on the two sides of the substrate will be different. This is because the electrochromic effect on the top side of the substrate is caused by a current which flows in a direction opposite to that which created the electrochromic effect on the bottom side of the substrate. Of course, where the electrochromic materials are the same on both sides of the substrate, the electrochromic material must be such that the electrochromic effects can be induced by a current flowing in either a positive or a negative direction in order for the electrochromic material to be useful in a double sided display. However, the electrochromic materials in the ionically isolative, electrically conductive layers on opposite sides of the substrate can be different in order to obtain desired color effects. The electrochromic materials can be chosen, for example, such that the color created in one material from a current passing in a positive direction is the same as the color created in another material for a current passing in a negative direction so that the same colors appear at the same time on both sides of the substrate.

For the double sided electrochromic display of the present invention, a variety of alternatives are available for creating images of a desired pattern, as was the case for the single sided electrochromic display. Thus, opaque masks can be used on either or both sides of the substrate for masking the respective electrochromic effects to generate displays having desired patterns. Similarly, the working and counter electrodes can be printed or formed on the substrate in the desired patterns to be displayed on the front and back sides of the substrate, or both the working electrode and ionically isolative layer on the top side of the substrate, as well as the counter electrode and the ionically isolative layer on the bottom side of the substrate, can be printed or formed in a desired pattern to display a desired image, as for either side of a single sided display in FIG. 3.

While the above-described single and double sided displays use electrochromic material or materials in the ionically isolative, electrically conducting layers covering one or both electrodes to create an electrochromic effect, as an alternative to using electrochromic materials dispersed in these layers (or perhaps in addition to doing so), it is possible to use a reversible deposition of a metal (for example, bismuth) from a salt dissolved in the electrolyte laminated over either side of the substrate. The deposition would cause a color change over one electrode at the interface of the electrolyte and the ionically isolative, electrically conductive layer in the vicinity of the electrode, or at the other, depending upon the direction of the current flow. Two color changes would occur if metal previously deposited over the other electrode simultaneously dissolves.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A double-sided electrochromic display device, comprising:

a substrate having at least a first surface and a second surface;

an electrode assembly consisting essentially of a working electrode on the first surface of the substrate and a counter electrode on the second surface of the substrate;

a first ionically isolative, electrically conductive layer on and electrically coupled to the working electrode;

a first electrolyte layer over the first surface of the substrate covering the first ionically isolative, electrically conductive layer;

a second ionically isolative, electrically conductive layer on and electrically coupled to the counter electrode;

a second electrolyte layer over the second surface of the substrate covering the second ionically isolative, electrically conductive layer, and in ionic communication with the first electrolyte layer; and an electrochemically active material disposed within the electrochromic display device so that, when an electric potential is applied between the working electrode and the counter electrode, a first electrochromic reaction occurs at an interface between the first electrolyte layer and the first ionically isolative, electrically conductive layer and a second electrochromic reaction occurs at an interface between the second electrolyte layer and the second ionically isolative, electrically conductive layer, the first electrochromic reaction resulting in a first color change and the second electrochromic reaction resulting in a second color change; and one of the first electrochromic reaction and the second electrochromic reaction being an anodic reaction and the other being a cathodic reaction.

2. The device of claim 1, wherein the substrate is planar, and the first surface of the substrate and the second surface of the substrate are on opposite sides of the substrate.

3. The device of claim 2, wherein the ionic communication between the first and second electrolyte layers occurs through at least one hole in the substrate.

4. The device of claim 3, wherein the working electrode is formed in a first image defining pattern, and the counter electrode is formed in a second image defining pattern;

the first color change occurs in a region of the interface between the first electrolyte layer and the first ionically isolative, electrically conductive layer that is over the first image defining pattern; and the second color change occurs in a region of the interface between the second electrolyte layer and the second ionically isolative, electrically conductive layer that is over the second image defining pattern.

5. The device of claim 3, wherein the first ionically isolative, electrically conducting layer contains a first electrochromic material.

6. The device of claim 5, wherein the second ionically isolative, electrically conducting layer contains a second electrochromic material.

7. The device of claim 6, wherein the first electrochromic material and the second electrochromic material are the same.

8. The device of claim 3, wherein the electrolyte contains a metal salt containing a reversibly precipitable metal, the metal depositing or dissolving in a pattern over the working electrode and the counter electrode depending upon a polarity of the working electrode relative to the counter electrode, the deposition thereby resulting in either the first color change or the second color change and the dissolving thereby resulting in the other color change, depending upon said polarity.

9. The device of claim 3, wherein the ionic communication occurs through a plurality of holes through a portion of substrate covered on opposite sides by the first and the second ionically conductive, electrically insulating layers, the plurality of holes extending through the first and the second ionically conductive, electrically insulating layers.

10. A method of operating a double-sided electrochromic display device containing electrochromic material and having an electrode assembly consisting essentially of a working electrode on a first side of a substrate and a counter electrode on a second side of the substrate, a first ionically isolative, electrically conductive layer covering the working electrode, a first electrolytic layer over the first ionically isolative, electrically conductive layer, and a second ionically isolative, electrically conductive layer covering the counter electrode, and a second electrolytic layer over the second ionically isolative, electrically conductive layer, wherein the first and second electrolytic layers are in ionic communication with one another, the method comprising the step of:

applying a voltage across the working and counter electrodes to change a color of electrochromic material at an interface between the first electrolytic layer and the first ionically isolative, electrically conductive layer and to change a color of electrochromic material at an interface between the second electrolytic layer and the second ionically isolative, electrically conductive layer, the electrochromic material at one of the interfaces undergoing an anodic electrochromic reaction and the electrochromic material at the other interface undergoing a cathodic electrochromic reaction.

11. The method of claim 10, further comprising the step of:

removing the applied voltage to reverse the changes in color at the respective interfaces.

12. The method of claim 10, wherein electrochromic material is contained within the first ionically isolative, electrically conductive layer and within the second ionically isolative, electrically conductive layer.

13. The method of claim 12, wherein the electrochromic material contained within the first ionically isolative, electrically conductive layer the electrochromic material contained within the second ionically isolative, electrically conductive layer are the same.

14. The method of claim 10, wherein a metal salt is dissolved in the first and the second electrolytic layers, and wherein the step of applying the voltage comprises the step of depositing metal from the metal salt at an interface of either the first or the second electrolytic layer and a region of the corresponding one of the first or the second ionically isolative, electrically conductive layer covering the working electrode or the counter electrode, respectively, and further comprising the step of reversing the polarity of the applied voltage to redissolve the deposited metal and to deposit metal from the metal salt at the other interface.

15. A process for manufacturing a double-sided electrochromic display device, comprising the steps of:

positioning an electrode assembly consisting essentially of a working electrode on a first side of a substrate and a counter electrode on a second side of the substrate;

laminating a first ionically isolative, electrically conductive layer containing a first electrochromically active material over the working electrode and a second ionically isolative, electrically conductive layer containing a second electrochromically active material over the counter electrode;

laminating a first electrolyte layer over the first ionically isolative, electrically conductive layer and a second electrolyte layer over the second ionically isolative, electrically conductive layer; and ionically coupling the first electrolyte layer to the second electrolyte layer through at least one opening in the substrate.

16. The process of claim 15, wherein the step of positioning includes forming the working electrode in a first image-defining pattern and the counter electrode into a second image-defining pattern.

17. The process of claim 16, further comprising the step of forming the at least one opening in the substrate through at least one of the first image-defining pattern and the second image-defining pattern.

18. A process for manufacturing a double-sided electrochromic display device, comprising the steps of:

positioning an electrode assembly consisting essentially of a working electrode on a first side of a substrate and a counter electrode on a second side of the substrate;

laminating a first ionically isolative, electrically conductive layer over the working electrode and a second ionically isolative, electrically conductive layer over the counter electrode;

laminating a first electrolyte layer over the first ionically isolative, electrically conductive layer and a second electrolyte layer over the second ionically isolative, electrically conductive layer; and ionically coupling the first electrolyte layer to the second electrolyte layer through at least one opening in the substrate;

wherein the first electrolyte layer and the second electrolyte layer contain a dissolved salt of a reversibly precipitable metal that precipitates at either an interface of the first electrolyte layer and the first ionically isolative, electrically conductive layer or an interface of the second electrolyte layer and the second ionically isolative, electrically conductive layer, depending upon a polarity of the applied voltage.

19. The process of claim 18, wherein the step of positioning includes forming the working electrode in a first image-defining pattern and the counter electrode in a second image-defining pattern.

20. The process of claim 19, further comprising the step of forming the at least one opening in the substrate through at least one of the first image-defining pattern and the second image-defining pattern.

* * * * *